United States Patent
Wu

(10) Patent No.: US 9,914,502 B2
(45) Date of Patent: Mar. 13, 2018

(54) DETACHABLE CHAINRING ASSEMBLY

(71) Applicant: TH INDUSTRIES CO., LTD., Taichung (TW)

(72) Inventor: Poki Wu, Taichung (TW)

(73) Assignee: TH INDUSTRIES CO., LTD., Taichung (TW)

(*) Notice: Subject to any disclaimer, the term of this patent is extended or adjusted under 35 U.S.C. 154(b) by 209 days.

(21) Appl. No.: 15/140,440

(22) Filed: Apr. 27, 2016

(65) Prior Publication Data
US 2017/0174288 A1    Jun. 22, 2017

(30) Foreign Application Priority Data
Dec. 17, 2015   (TW) .............................. 104220297 A

(51) Int. Cl.
  *B62M 9/10* (2006.01)
  *F16H 55/30* (2006.01)

(52) U.S. Cl.
  CPC .......... *B62M 9/105* (2013.01); *F16H 55/303* (2013.01)

(58) Field of Classification Search
  CPC ....... B62M 9/10; B62M 9/105; F16H 55/303; F16H 55/30; F16H 55/12
  See application file for complete search history.

(56) References Cited

U.S. PATENT DOCUMENTS

| 2,451,690 | A  |    | 10/1948 | Oehler et al. |              |
| 2008/0207369 | A1 | *  | 8/2008  | Bouchez ............... | B62M 9/105 474/160 |
| 2011/0319209 | A1 | *  | 12/2011 | Huang ..................... | B21K 1/28 474/164 |
| 2016/0238122 | A1 | *  | 8/2016  | Medaglia ................ | F16H 55/12 |

FOREIGN PATENT DOCUMENTS

CN    103108799    5/2013

* cited by examiner

*Primary Examiner* — William E Dondero
*Assistant Examiner* — Robert T Reese
(74) *Attorney, Agent, or Firm* — Chieh-Mei Wang

(57) ABSTRACT

A detachable chainring assembly includes a first chainring, a second chainring and a locking part. The first chainring includes a first through hole. The second chainring includes a first surface, a second surface, a driven hole, and a plurality of first protrusion parts. The second surface is opposite to the first surface. The driven hole runs through the first surface and the second surface for securing a driving portion of a crank arm. The first protrusion parts protrude from the second surface and are disposed around the driven hole, and at least one of the first protrusion parts has a first locked hole. The locking part is detachably secured to the first through hole and the first locked hole such that the first chainring and the second chainring are jointly secured to each other via the locking part.

10 Claims, 4 Drawing Sheets

DETACHABLE CHAINRING ASSEMBLY

FIELD OF THE INVENTION

The present invention relates to a detachable chainring assembly, and more particularly to a detachable chainring assembly adapted for bicycles.

BACKGROUND OF THE INVENTION

Recently, a crank assembly adapted for a speed-changing bicycle includes a crank arm and at least two chainrings secured with the crank arm. One of the chainrings may be connected to a rear freewheel which is connected to a hub of a rear wheel via a chain. Thus, when the rider pedals to drive one of the chainrings being rotated clockwise, the chain movably drives the rear freewheel rotating clockwise such the rear wheel rotatably drives the bicycle moving forward.

The conventional crank assembly is formed by the crank arm secured with the chainrings via a spider. However, the spider of the conventional crank assembly may cause a limitation about selecting the chainrings and the corresponding crank arm. For example, owing to the structure limitation of the spider, the crank arm and the chainrings of the conventional crank assembly adapted for the mountain bike are limited to be only suited to being provided with the mountain bike, that is to say, the crank arm and the chainrings of the conventional crank assembly adapted for the mountain bike cannot be replaceable for the road bike. Simultaneously, the chainrings have to keep some space for being secured with the spider such that the chainring may not be enough securing space for another element used to be stably secured with another chainring.

On the other hand, reducing the weight of the bicycle is a goal in the bicycle industry. In order to reduce the weight of the crank assembly of the bicycle, the two chainrings are integrated to each other. Furthering, the crank arm is directly secured with one of the chainrings such that the crank assembly do not have to be assembled with the spider, as resulting in reducing the weight of the crank assembly of the bicycle. However, when one of the two integrated chainrings of the crank assembly has a breakdown and need to be displaced a new chainring, the two integrated chainrings must be simultaneously displaced with two new chainrings such that the users disburse more cost.

Therefore, it is necessary to improve the above problems of the conventional chainring assembly.

SUMMARY OF THE INVENTION

The present disclosure provides a bicycle component fastening device, for solving problems caused by conventional techniques.

An embodiment of the present disclosure provides a detachable chainring assembly, including a first chainring, a second chainring and a locking part. The first chainring includes first through hole. The second chainring includes a first surface, a second surface, a driven hole, and a plurality of first protrusion parts. The second surface is opposite to the first surface. The driven hole runs through the first surface and the second surface for securing a driving portion of a crank arm. The first protrusion parts protrude from the second surface and are disposed around the driven hole, and at least one of the first protrusion parts has a first locked hole. The locking part is detachably secured to the first through hole and the first locked hole such that the first chainring and the second chainring are jointly secured to each other via the locking part.

In an embodiment of the present disclosure, the second chainring includes an installation portion having an open slot and a side wall disposed around the driven hole. When the driving portion of the crank arm is secured to the driven hole, the driving portion of the crank arm is disposed in the installation portion and abutted against an inner surface of the side wall, and a body of the crank arm is disposed in the open slot.

In an embodiment of the present disclosure, the first chainring includes a plurality of second protrusion parts disposed in a surface of the first chainring away from the second chainring. The first through hole is disposed in one of the second protrusion parts. The second protrusion parts are aligned with the first protrusion parts and the first through hole is aligned with the first locked hole. The locking part is secured to the first through hole and the first locked hole such that the first chainring and the second chainring are jointly secured to each other via the locking part.

In an embodiment of the present disclosure, the detachable chainring assembly further includes a third chainring detachably secured to the first chainring. The first chainring is disposed between the second chainring and the third chainring.

In an embodiment of the present disclosure, the locking part detachably runs through the first locked hole to secure the first chainring, the second chainring and the third chainring.

In an embodiment of the present disclosure, the third chainring includes at least one second through hole disposed in a surface of the third chainring away from the second chainring. The second through hole is aligned with the first locked hole of the first protrusion part.

In an embodiment of the present disclosure, the driven hole has a spline edge.

In an embodiment of the present disclosure, at least one of the first protrusion parts has a curved surface.

In an embodiment of the present disclosure, the driving portion of the crank arm includes a jogged part for engaging the driven hole.

In an embodiment of the present disclosure, the jogged part has a spline structure for joggling the spline edge of the driven hole.

The detachable chainring assembly of the present disclosure does not have to be secured with any spiders and is capable of securing to the crank arm. In this way, the component commonness between the detachable chainring assembly and the crank arm is increased, the diversity adapted for the crank arm and the chainring is also increased, and the chainring can be adapted for many kinds of bicycles. Meanwhile, the second chainring needs not be disposed with any components for securing to a spider; therefore, the second surface of the second chainring has more space for the first protrusion part to be disposed thereon. Giving that the first protrusion part is protruded from the second surface of the second chainring, when the locking part runs through the first locked hole to secure to the first chainring and the second chainring, a contacting area between the locking part and the second chainring is increased. In this way, the stability of the locking part for securing the second chainring is improved, as the first chainring and the second chainring are stably secured to each other via the locking part. Furthermore, the first chainring and the second chainring of the detachable chainring assembly of the present disclosure are capable of detachably securing to each other, meaning that the first chainring or the second chainring may be replaced alone when the first chainring or the second chainring has a breakdown, therefore increasing the economic benefits of the detachable chainring assembly.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
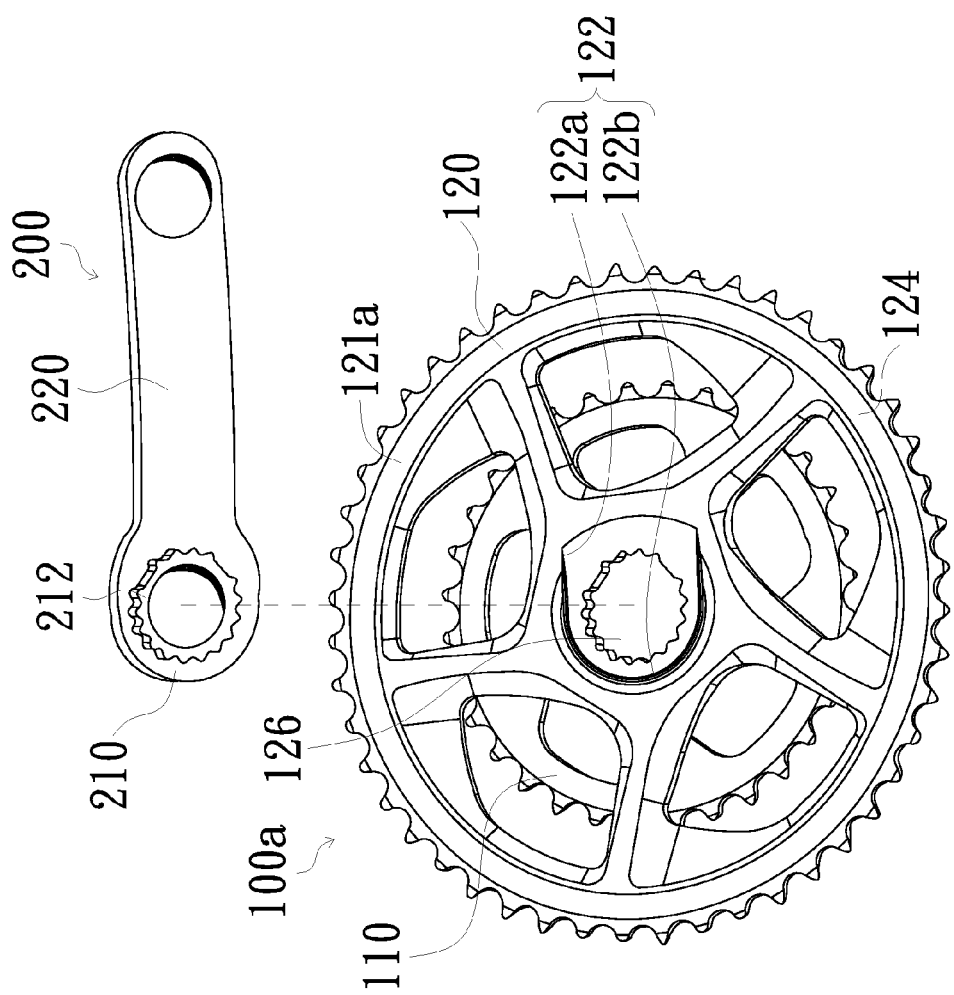
FIG. 1 shows a perspective view of a detachable chainring assembly according to an embodiment of the present disclosure.
Figure 1A:
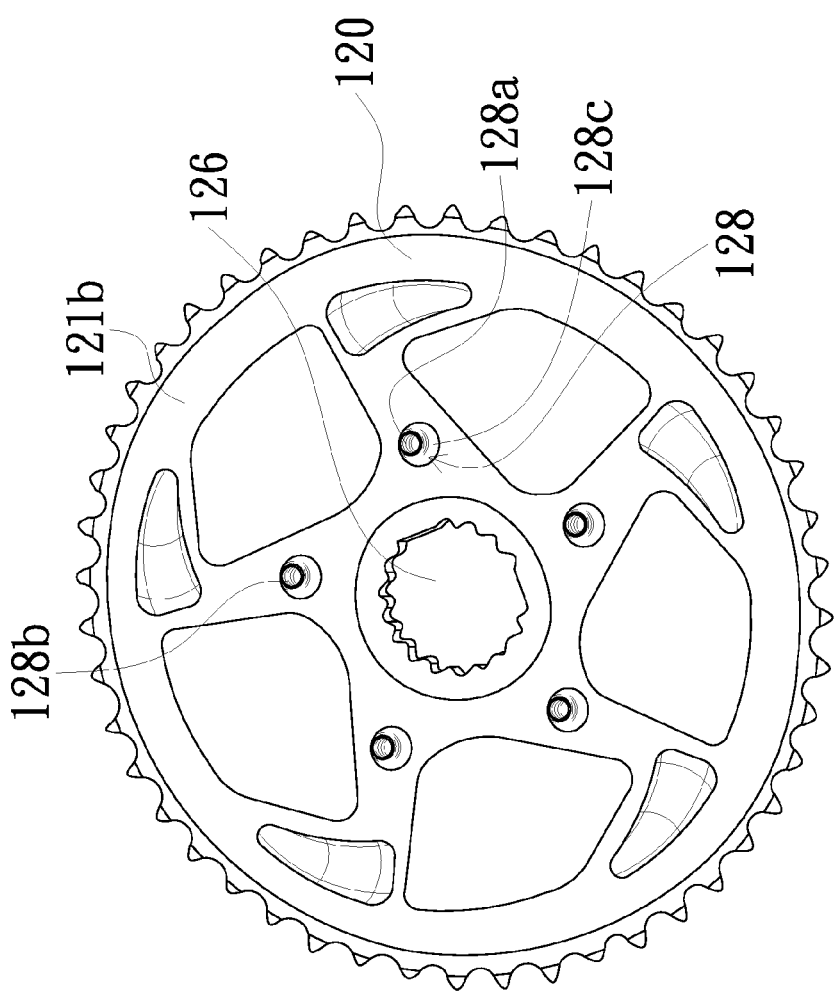
FIG. 1A shows a perspective view of another perspective of a second chainring of the detachable chainring assembly of FIG. 1.
Figure 2:
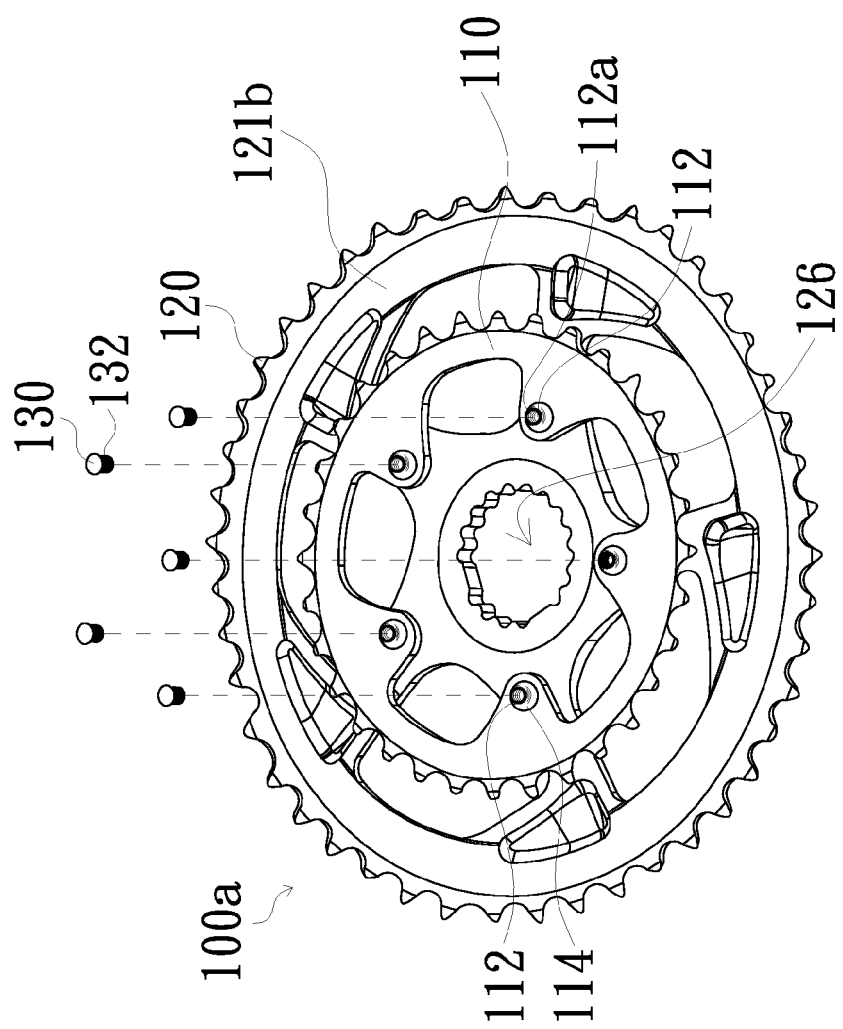
FIG. 2 shows a perspective view of another perspective of the detachable chainring assembly of FIG. 1.

Please refer to FIG. 1, FIG. 1A, and FIG. 2, FIG. 1 shows a perspective view of a detachable chainring assembly according to an embodiment of the present disclosure, FIG. 1A shows a perspective view of another perspective of a second chainring of the detachable chainring assembly of FIG. 1, and FIG. 2 shows a perspective view of another perspective of the detachable chainring assembly of FIG. 1. As shown in FIG. 1, FIG. 1A, and FIG. 2, the detachable chainring assembly 100a of the embodiment is adapted for a crank assembly without a spider. A crank arm 200 may be directly secured to the detachable chainring assembly 100a of the embodiment and need not coordinate with any spiders to be jointly secured to the detachable chainring assembly 100a.

The detachable chainring assembly 100a of the embodiment includes a first chainring 110, a second chainring 120 and a plurality of locking parts 130; the plurality locking parts 130 are detachably secured to the first chainring 110 and the second chainring 120 such the first chainring 110 and the second chainring 120 are secured to each other via the locking parts 130. In the embodiment, the first chainring 110 and the second chainring 120 may be, but not limited to, coaxial. A radius of the first chainring 110 may be, but not limited to, larger than a radius of the second chainring 120. That is to say, a size of the first chainring 110 may be, but not limited to, larger than a size of the second chainring 120.

In detail, the second chainring 120 includes a first surface 121a, a second surface 121b, a driven hole 126, and a plurality of first protrusion parts 128. The second surface 121b is opposite to the first surface 121a. The driven hole 126 runs through the first surface 121a and the second surface 121b for securing a driving portion 210 of the crank arm 200. The first protrusion parts 128 protrude from the second surface 121b and are disposed around the driven hole 126; the first protrusion parts 128 have several first locked holes 128a, and each of the first locked holes 128a may be disposed at a center of one of the first protrusion parts 128. The locking parts 130 are detachably secured with and run through the first locked holes 128a to be jointly secured to the first chainring 110 and the second chainring 120. It should be noted that each of the first protrusion parts 128 may extend from the second surface 121b of the second chainring 120 along a direction of the first chainring; that is to say, the first protrusion parts 128 and the second chainring 120 may be, but not limited to, integrated. In another embodiment, the first protrusion parts 128 may be connected to the second surface 121b of the second chainring 120 by another way; for example, the first protrusion parts 128 may be connected to the second surface 121b of the second chainring 120 via welding. On the other hand, a radius of a bottom surface of one of the first protrusion parts 128 connected to the second surface 121b of the second chainring 120 may be, but not limited to, larger than a radius of a top surface of the first protrusion part 128 away from the second surface 121b of the second chainring 120.

Giving that the first chainring 110 includes a plurality of first through holes 112, the locking parts 130 are respectively secured to and run through the first locked holes 128a after the locking parts 130 are respectively secured to and run through the first through holes 112, and thus the first chainring 110 and the second chainring 120 are jointly secured to each other via the locking parts 130. Therefore, when the first chainring 110 or the second chainring 120 has a breakdown and needs to be replaced with a new one, the locking parts 130 of the detachable chainring assembly 100a may be released such that the first chainring 110 and the second chainring 120 may be disassembled respectively; and thus replacing only the broken chainring (such as the first chainring 110 or the second chainring 120) would be required to solve the breakdown problem. In addition, giving that the first protrusion parts 128 are disposed on the second chainring 120, when the locking parts 130 run through and are secured to the second chainring 120, a contacting area between each of the locking parts 130 and the second chainring 120 is increased such that the stability of each of the locking parts 130 when secured to the second chainring 120 is improved. In this embodiment, at least one of the first protrusion parts 128 has a curved surface 128c. Meanwhile, the first chainring 110 includes a plurality of second protrusion parts 114 disposed on a surface of the first chainring 110 away from the second chainring 120, and the first through hole 112 is disposed in and run through one of the second protrusion parts 114. It should be noted that the structure of the second protrusion parts 114 may be, but not limited to, similar to the structure of the first protrusion parts 128. In the embodiment, a radius of a bottom surface of one of the second protrusion parts 114 disposed on the first chainring 110 may be, but not limited to, larger than a radius of a top surface of the second protrusion part 114 away from the top surface of the first chainring 110. In the other hand, the thickness of each of the second protrusion parts 114 may be, but not limited to, smaller than the thickness of one of the first protrusion parts 128. In some embodiments, the detachable chainring assembly may only include the first protrusion parts disposed on the second chainring, but the first chainring needs not include the second protrusion parts disposed thereon. In this embodiment, the second protrusion parts 114 are aligned with the first protrusion parts 128 and the first through holes 112 are aligned with the first locked holes 128a; the locking parts 130 are receptively secured to the first through holes 112 and the first locked holes 128a, such that the first chainring 110 and the second chainring 120 are jointly secured to each other via the locking parts 130.

In this embodiment, giving that the first protrusion parts 128 are disposed on the second chainring 120 and the second protrusion parts 114 are disposed on the first chainring 110, when the locking parts 130 run through and are secured to the first chainring 110 and the second chainring 120, the contacting area between each of the locking parts 130 and the second chainring 120 and the contacting area between each of the locking parts 130 and the first chainring 110 are increased such that the stability of the first chainring 110 and the second chainring 120 when secured to each other via the locking parts 130 can be improved.

In this embodiment, an outer wall of each of the locking parts 130 has an external thread 132 disposed thereon and the corresponding one of the first locked holes 128a of the first protrusion parts 128 has an internal thread 128b disposed thereon, such that each of the locking parts 130 may be screwed to one of the first locked holes 128a. Meanwhile, the first through holes 112 of the first chainring 110 also have internal threads 112a disposed thereon such that the first through holes 112 may be respectively screwed to the locking parts 130.

Furthermore, in this embodiment, the second chainring 120 includes an installation portion 122 disposed on the first surface 121a and having an open slot 122a and a side wall 122b. The driving portion 210 of the crank arm 200 is disposed in the installation portion 122 and abutted against an inner surface of the side wall 122b, and parts of a body 220 of the crank arm 200 is disposed in the open slot 122a. In the embodiment, a shape of the side wall 122b of the installation portion 122 is suited to a shape of the driving portion 210 of the crank arm 200, such that the driving portion 210 of the crank arm 200 may be stably disposed in the installation portion 122. For example, when the driving portion 210 of the crank arm 200 is a curved terminal and the side wall 122b of the installation portion 122 is a curved sidewall. Furthermore, when the driving portion 210 of the crank arm 200 is disposed in the installation portion 122, two lateral walls of the body 220 of the crank arm 200 may be abutted against the open slot 122a such that the crank arm 200 may movably drive the second chainring 120 to rotate such that the first chainring 110 and the second chainring 120 may cooperatively rotate.

Furthering, a top edge of the side wall 122b of the installation portion 122 may be, but not limited to, higher than an edge 124 of the second chainring 120. In the embodiment, the driven hole 126 of the second chainring 120 is disposed in the installation portion 122; that is to say, the installation portion 122 is disposed around the driven hole 126 and the driving portion 210 of the crank arm 200 is partially engaged with the driven hole 126 such that the crank arm 200 is secured to the second chainring 120. For example, the driving portion 210 of the crank arm 200 has a jogged part 212 disposed on a surface of the driving portion 210 for engaging the driven hole 126, and a shape of the driving portion 210 of the crank arm 200 corresponds to a shape of the driven hole 126, such that the stability of the driving portion 210 of the crank arm 200 when engaging the driven hole 126 is increased.

In the embodiment, the driven hole 126 has a spline edge, and the jogged part 212 of the driving portion 210 of the crank arm 200 has a spline structure for joggling the spline edge of the driven hole 126 to avoid relative movement between the crank arm 200 and the second chainring 120 when the crank arm 200 is engaged with the second chainring 120. In this way, the crank arm 200 may stably drive the second chainring 120 to rotate. It should be noted that the shape of the driven hole 126 is not limited to the embodiment.

It should be noted that the locking parts 130, the first locked holes 128a, and the first though holes 112 of the embodiment are plural. However, it will be obvious that only one locking part, only one first locked hole, and only one first though hole may be employed in another embodiment.

Figure 3:
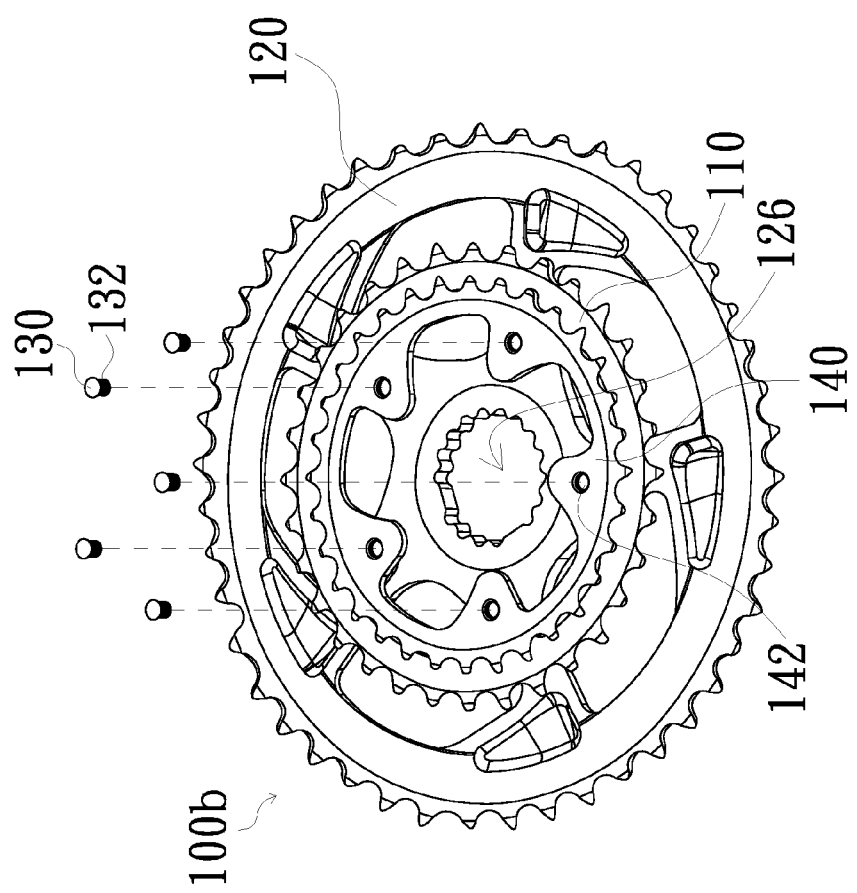
FIG. 3 shows a perspective view of a detachable chainring assembly according to another embodiment of the present disclosure.

Referring to FIG. 3, FIG. 3 shows a perspective view of a detachable chainring assembly according to another embodiment of the present disclosure. As shown in FIG. 3, the detachable chainring assembly 100b of the embodiment further includes a third chainring 140 detachably secured to the first chainring 110, and the first chainring 110 is disposed between the second chainring 120 and the third chainring 140. In the embodiment, a size of the third chainring 140 may be, but not limited to, smaller than the first chainring 110.

The detachable chainring assembly 100b of the embodiment may include a plurality of locking parts 130, and the plurality of locking parts 130 are detachably secured to the first chainring 110, the second chainring 120 and the third chainring 140. In detail, the third chainring 140 includes a plurality of second through holes 142 disposed on a surface of the third chainring 140 away from the second chainring 120, and the second through holes are aligned with the first locked holes 128a (see FIG. 1A) of the first protrusion part 128, and thus the locking parts 130 may simultaneously run through the second through holes 142 of the third chainring 140 and the first through holes 112 (see FIG. 2) of the first chainring 110, and further engage with the first locked holes 128a (see FIG. 1A) of the first protrusion part 128. As such, the first chainring 110, the second chainring 120, and the third chainring 140 may be jointly secured to each other via the locking parts 130. Therefore, when the first chainring 110, the second chainring 120 or the third chainring 140 has a breakdown and needs to be displaced with at least a new one, the locking parts 130 of the detachable chainring assembly 100b may be released such that the first chainring 110, the second chainring 120 and the third chainring 140 may be disassembled respectively; and thus displacing only the broken chainring (such as the first chainring 110, the second chainring 120 or the third chainring 130) would be required to solve the breakdown problem.

It should be noted that the locking parts 130, the first locked holes 128a, the first though holes 112, and the second through holes 142 of the embodiment are plural. However, it will be obvious that only one locking part, only one first locked hole, only one first though hole, and only one second through hole may be employed in another embodiment.

As disclosed by the above-mentioned embodiments, the detachable chainring assembly of the present disclosure does not have to be secured with any spiders and is capable of securing to the crank arm. In this way, the component commonness between the detachable chainring assembly and the crank arm is increased, the diversity adapted for the crank arm and the chainring is also increased, and the chainring can be adapted for many kinds of bicycles. Meanwhile, the second chainring needs not be disposed with any components for securing to a spider; therefore, the second surface of the second chainring has more space for the first protrusion part to be disposed thereon. Giving that the first protrusion part is protruded from the second surface of the second chainring, when the locking part runs through the first locked hole to secure to the first chainring and the second chainring, a contacting area between the locking part and the second chainring is increased. In this way, the stability of the locking part for securing the second chainring is improved, as the first chainring and the second chainring are stably secured to each other via the locking part. Furthermore, the first chainring and the second chainring of the detachable chainring assembly of the present disclosure are capable of detachably securing to each other, meaning that the first chainring or the second chainring may be replaced alone when the first chainring or the second chainring has a breakdown, therefore increasing the economic benefits of the detachable chainring assembly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A detachable chainring assembly, comprising:
   a first chainring, comprising a first through hole running through the first chainring;
   a second chainring, comprising:
      a first surface;
      a second surface opposite to the first surface;
      a driven hole running through the first surface and the second surface for securing a driving portion of a crank arm; and
      a plurality of first protrusion parts protruding from the second surface and disposed around the driven hole, wherein at least one of the first protrusion parts has a first locked hole; and
   a locking part, detachably secured to the first through hole and the first locked hole such that the first chainring and the second chainring are jointly secured to each other via the locking part.

2. The detachable chainring assembly according to claim 1, wherein the second chainring comprises an installation portion having an open slot and a side wall disposed around the driven hole, and when the driving portion of the crank arm is secured to the driven hole, the driving portion of the crank arm is disposed in the installation portion and abutted against an inner surface of the side wall, and a body of the crank arm is disposed in the open slot.

3. The detachable chainring assembly according to claim 1, wherein the first chainring comprises a plurality of second protrusion parts disposed in a surface of the first chainring away from the second chainring, the first through hole is disposed in one of the second protrusion parts, the second protrusion parts are aligned with the first protrusion parts and the first through hole is aligned with the first locked hole, and the locking part is secured to the first through hole and the first locked hole such that the first chainring and the second chainring are jointly secured to each other via the locking part.

4. The detachable chainring assembly according to claim 1, further comprising a third chainring detachably secured to the first chainring, wherein the first chainring is disposed between the second chainring and the third chainring.

5. The detachable chainring assembly according to claim 4, wherein the locking part detachably runs through the first locked hole to secure the first chainring, the second chainring and the third chainring.

6. The detachable chainring assembly according to claim 4, wherein the third chainring comprises at least one second through hole disposed in a surface of the third chainring from the second chainring, and the second through hole is aligned with the first locked hole of the first protrusion part.

7. The detachable chainring assembly according to claim 1, wherein the driven hole has a spline edge.

8. The detachable chainring assembly according to claim 7, wherein the driving portion of the crank arm comprises a jogged part for engaging the driven hole.

9. The detachable chainring assembly according to claim 8, wherein the jogged part has a spline structure for joggling the spline edge of the driven hole.

10. The detachable chainring assembly according to claim 1, wherein at least one of the first protrusion parts has a curved surface.

* * * * *